(12) United States Patent
Sudou et al.

(10) Patent No.: US 8,265,443 B2
(45) Date of Patent: Sep. 11, 2012

(54) OPTICAL WAVEGUIDE DEVICE

(75) Inventors: Masaaki Sudou, Chiyoda-ku (JP); Katsutoshi Kondou, Chiyoda-ku (JP); Junichiro Ichikawa, Chiyoda-ku (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 263 days.

(21) Appl. No.: 12/661,590

(22) Filed: Mar. 19, 2010

(65) Prior Publication Data

US 2010/0239218 A1   Sep. 23, 2010

(30) Foreign Application Priority Data

Mar. 19, 2009   (JP) .................................. 2009-069094

(51) Int. Cl.
*G02B 6/36* (2006.01)
*G02B 6/10* (2006.01)

(52) U.S. Cl. .......................................... 385/129; 385/88

(58) Field of Classification Search .................. None
See application file for complete search history.

(56) References Cited

U.S. PATENT DOCUMENTS

| | | | |
|---|---|---|---|
| 5,499,309 A * | 3/1996 | Kozuka et al. | 385/38 |
| 6,243,524 B1 | 6/2001 | Funabashi | |
| 6,739,761 B2 * | 5/2004 | Tsukamoto et al. | 385/89 |
| 7,502,530 B2 | 3/2009 | Kondo et al. | |
| 2007/0274637 A1 * | 11/2007 | Shiraishi | 385/40 |

FOREIGN PATENT DOCUMENTS

| | | |
|---|---|---|
| JP | 5-150200 A | 6/1993 |
| JP | 5-224044 A | 9/1993 |
| JP | 11-121653 A | 4/1999 |
| JP | 11-194237 A | 7/1999 |
| JP | 2001-177181 A | 6/2001 |
| JP | 2005-129628 A | 5/2005 |
| JP | 2006-047894 A | 2/2006 |

* cited by examiner

*Primary Examiner* — Tina Wong
(74) *Attorney, Agent, or Firm* — Chapman and Cutler LLP

(57) ABSTRACT

To provide an optical waveguide device which can allow a light-receiving element to be precisely aligned with a diffused waveguide formed in a dielectric substrate to implement an evanescent coupling light-receiving element. An optical waveguide device includes a dielectric substrate 1, a diffused waveguide 2 formed by thermally diffusing a high-refractive material into the dielectric substrate, and a light-receiving element 4 which is disposed above the diffused waveguide and which receives a part of an optical wave propagating in the diffused waveguide. Here, at least a part 3 of a pedestal 3 and 5 supporting the light-receiving element above the dielectric substrate is formed by disposing the high-refractive material in a predetermined pattern in the vicinity of the diffused waveguide and thermally diffusing the high-refractive material at the same time as forming the diffused waveguide.

11 Claims, 3 Drawing Sheets

OPTICAL WAVEGUIDE DEVICE

CROSS-REFERENCE TO RELATED APPLICATION

The present application claims priority of Japanese Application JP2009-069094 filed on Mar. 19, 2009, the contents of which are hereby incorporated into this application by reference in their entirety.

BACKGROUND OF THE INVENTION (1) Field of the Invention

The present invention relates to an optical waveguide device, and more particularly, to an optical waveguide device including a diffused waveguide formed by thermally diffusing a high-refractive material in a dielectric substrate and a light-receiving element which is disposed above the diffused waveguide and which receives a part of an optical wave propagating in the diffused waveguide.

(2) Description of the Related Art

In an optical waveguide device such as an optical modulator including an optical waveguide, a part of optical waves propagating in the optical waveguide is directly monitored (referred to as "in-phase monitoring method") or a radiation-mode beam radiated from the optical waveguide such as an optical Y-junction coupler of the optical waveguide is monitored. For example, to keep an output beam of an optical modulator in a constant output status, the output beam of the optical modulator is monitored and the magnitude of a modulation voltage or a DC bias applied to the optical modulator is controlled on the basis of the variation of the output beam.

In an optical modulator including a Mach-Zehnder type optical waveguide, a method of monitoring a radiation-mode beam radiated from an optical Y-junction coupler used for monitoring a bias point of the modulator has an advantage that the loss of a signal beam is suppressed, but has the following disadvantages. (1) A signal beam and a monitored beam are reverse in phase and a phase difference is deviated from π, (2) A structure for efficiently taking out the radiation-mode beam is complex and it is difficult to align a light-receiving element on a substrate, thereby making a decrease in size or a decrease in cost difficult, and (3) in a multi-stage optical modulator including plural optical modulators, it is difficult to accurately monitor the radiation-mode beam by the use of portions other than the final-stage optical Y-junction coupler.

On the contrary, in an in-phase monitoring method of directly monitoring a part of optical waves propagating in an optical waveguide, there is no phase difference from a signal beam and it is possible to monitor the signal beams of the optical modulators by the use of portions other than the final-stage optical Y-junction coupler in the multi-stage optical modulator.

Examples of the in-phase monitoring method include a method of forming a slit in a part of an optical waveguide and receiving a reflected beam with a mirror as described in Patent Literature 1, a method of generating a radiated beam in an S-shaped optical waveguide and receiving the radiated beam as described in Patent Literature 2, and a method of forming a hole having a conical shape or the like in the optical waveguide, filling the hole with a high-refractive material, and guiding and receiving optical waves to the upside of the optical waveguide as described in Patent Literature 3.

In these methods, since all the beams extracted from the guided beams cannot be received in principle, there is a problem in that the optical power which can be received by a light-receiving element and the loss of the guided beams is great, that is, the excessive loss is great.

On the other hand, an evanescent coupling light-receiving element has been suggested. A light-receiving element (high-refractive substrate of the light-receiving element with a refractive index np) having a refractive index higher than that of the optical waveguide (with an effective refractive index nf) is disposed close to the optical waveguide and an evanescent wave is input to the light-receiving element at an angle of $\sin^{-1}(nf/np)$ about the waveguide. It is possible to detect the evanescent wave by disposing a light-receiving portion of the light-receiving element in an optical path of an incident beam.

The evanescent coupling light-receiving element has an advantage that the excessive loss can be made to converge on 0% theoretically by a design of the light-receiving element. The light-receiving sensitivity ((optical power received by light-receiving element)/(optical power propagating in waveguide)) is determined depending on the length of a part contacting the optical waveguide and a gap between the optical waveguide and the light-receiving element. Accordingly, when the shape of the light-receiving element is determined, it is possible to adjust the received optical power by adjusting the gap between the optical waveguide and the light-receiving portion (light-receiving element).

As described in Patent Literature 4, a semiconductor waveguide device has been suggested as an example of the evanescent coupling light-receiving element. In the semiconductor waveguide device, since the optical waveguide or the light-receiving element is formed by the crystalline growth, it is possible to control the thicknesses of layers with high precision and to reproducibly form the structure, thereby guaranteeing stable received optical power.

On the contrary, to implement an evanescent coupling light-receiving element in the diffused waveguide formed on a dielectric substrate, it is considered that a light-receiving element is bonded to the surface of the optical waveguide with an adhesive or by direct bonding. However, as described above, the light-receiving sensitivity is determined depending on the gap between the optical waveguide and the light-receiving element formed of a high-refractive material for absorbing light. Accordingly, a high-precision gap adjustment is inevitable for stably maintaining the light-receiving sensitivity. In the diffused waveguide, the surface of the optical waveguide swells and is thus not flat. Accordingly, it is difficult to control the gap between the diffused waveguide and the light-receiving element. A certain thickness and a certain area of the adhesive are necessary for bonding the light-receiving element to the dielectric substrate with high reliability and satisfactory strength.

[Citation List]
 [Patent Literatures]
 [Patent Literature 1] JP-A-2006-47894
 [Patent Literature 2] JP-A-5-224044
 [Patent Literature 3] JP-A-11-194237
 [Patent Literature 4] JP-A-2005-129628

DISCLOSURE OF THE INVENTION

Summary of the Invention

Problem to be Solved by the Invention

The invention is contrived to solve the above-mentioned problems and an object thereof is to provide an optical waveguide device which can allow a light-receiving element to be precisely aligned with a diffused waveguide formed in a dielectric substrate to implement an evanescent coupling light-receiving element.

Means for Solving Problems

According to an aspect of the invention, there is provided an optical waveguide device including a dielectric substrate, a diffused waveguide formed by thermally diffusing a high-refractive material into the dielectric substrate, and a light-receiving element which is disposed above the diffused waveguide and which receives a part of an optical wave propagating in the diffused waveguide, wherein at least a part of a pedestal supporting the light-receiving element above the dielectric substrate is formed by disposing the high-refractive material in a predetermined pattern in the vicinity of the diffused waveguide and thermally diffusing the high-refractive material at the same time as forming the diffused waveguide.

In the optical waveguide device, the dielectric substrate may be formed of lithium niobate and the high-refractive material may be titanium.

In the optical waveguide device, the predetermined pattern may be an island-like pattern with a gap in at least one side of the diffused waveguide and may be configured to discharge or introduce an adhesive bonding the light-receiving element to the dielectric substrate from or into the gap.

In the optical waveguide device, the total area of a portion of the predetermined pattern corresponding to the pedestal contacting the bottom of the light-receiving element may be equal to or less than 60% of the total area of the bottom of the light-receiving element.

In the optical waveguide device, a film for adjusting the gap between the waveguide and the bottom of the light-receiving element may be disposed in one or both of the top surface of the pedestal formed of the high-refractive material and the surface of the light-receiving element opposed to the pedestal.

Effects of the Invention

According to the above-mentioned configuration, the optical waveguide device includes a dielectric substrate, a diffused waveguide formed by thermally diffusing a high-refractive material into the dielectric substrate, and a light-receiving element which is disposed above the diffused waveguide and which receives a part of an optical wave propagating in the diffused waveguide, wherein at least a part of a pedestal supporting the light-receiving element above the dielectric substrate is formed by disposing the high-refractive material in a predetermined pattern in the vicinity of the diffused waveguide and thermally diffusing the high-refractive material at the same time as forming the diffused waveguide. Accordingly, the height of the pedestal can be accurately controlled to the same height as the surface swell of the diffused waveguide, thereby precisely aligning the light-receiving element with the diffused waveguide. Therefore, the evanescent coupling light-receiving element can be embodied in the optical waveguide device employing the diffused waveguide.

According to the above-mentioned configuration, since the dielectric substrate is formed of lithium niobate and the high-refractive material is titanium, the evanescent coupling light-receiving element can be embodied using a material generally used in an optical waveguide device such as an optical modulator.

According to the above-mentioned configuration, the predetermined pattern for the pedestal is an island-like pattern with a gap in at least one side of the diffused waveguide and is configured to discharge or introduce an adhesive bonding the light-receiving element to the dielectric substrate from or into the gap. Accordingly, it is possible to suppress the adhesive from being interposed between the pedestal and the light-receiving element, thereby preventing the gap between the diffused waveguide and the light-receiving element from varying with the thickness of the adhesive. Therefore, it is possible to precisely align the light-receiving element with the diffused waveguide.

According to the above-mentioned configuration, the total area of a portion of the predetermined pattern corresponding to the pedestal contacting the bottom of the light-receiving element is equal to or less than 60% of the total area of the bottom of the light-receiving element. Accordingly, it is possible to guarantee the bonding area necessary between the light-receiving element and the dielectric substrate while guaranteeing the satisfactory light-receiving sensitivity, thereby bonding the light-receiving element and the dielectric substrate with satisfactory mechanical strength.

According to the above-mentioned configuration, a film for adjusting the gap between the waveguide and the bottom of the light-receiving element is disposed in one or both of the top surface of the pedestal formed of the high-refractive material and the surface of the light-receiving element opposed to the pedestal. Accordingly, the lack of height in the height of the pedestal formed at the same time as forming the diffused waveguide can be precisely compensated for by another film, thereby accurately controlling the gap between the diffused waveguide and the light-receiving element.

EXPLANATIONS OF SYMBOLS

1: DIELECTRIC SUBSTRATE
2: DIFFUSED WAVEGUIDE
3: PEDESTAL
4: LIGHT-RECEIVING ELEMENT
5, 6: FILM
7: ADHESIVE
40: LIGHT-RECEIVING PORTION
42: SUBSTRATE FORMED OF HIGH-REFRACTIVE MATERIAL

DESCRIPTION OF THE PREFERRED EMBODIMENTS

Figure 1:
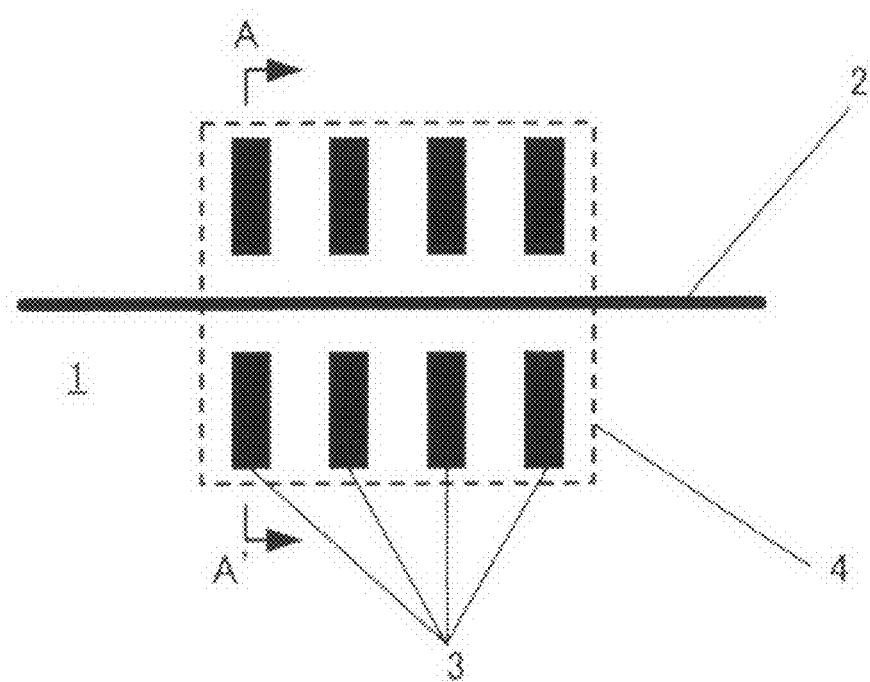
FIG. 1 is a plan view schematically illustrating an optical waveguide device according to the invention.
Figure 2:
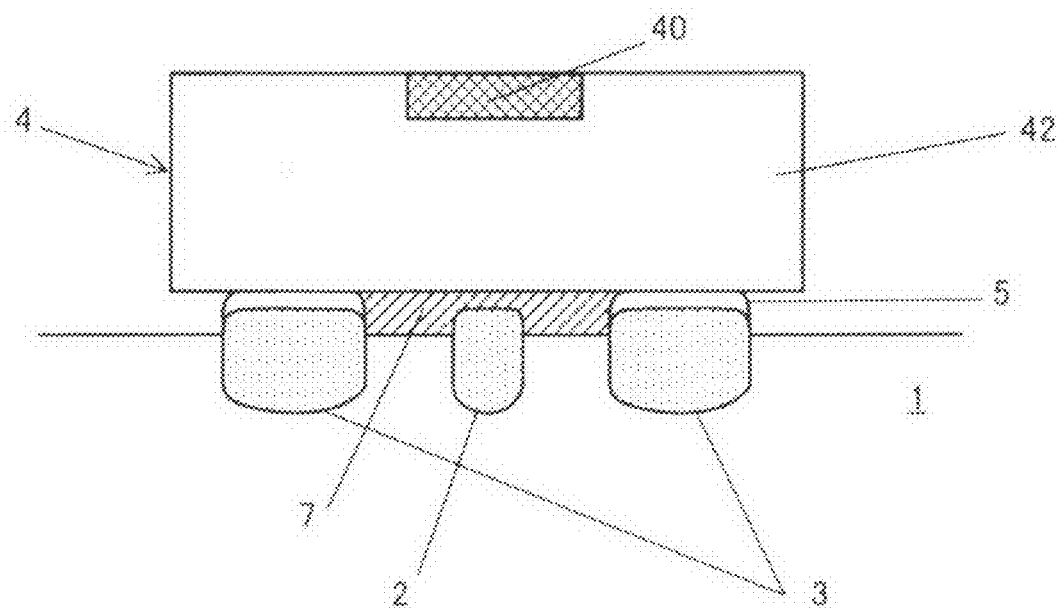
FIG. 2 is a sectional view taken along arrow line A-A' of FIG. 1 according to a first embodiment of the invention.

Hereinafter, an optical waveguide device according to the invention will be described in detail. FIG. 1 is a plan view illustrating the optical waveguide device according to the invention. FIG. 2 is a sectional view taken along arrow line A-A' of FIG. 1 according to a first embodiment of the invention.

The optical waveguide device according to the invention includes a dielectric substrate 1, a diffused waveguide 2 formed by thermally diffusing a high-refractive material into the dielectric substrate, and a light-receiving element 4 which is disposed above the diffused waveguide and which receives a part of an optical wave propagating in the diffused waveguide. Here, at least a part 3 of a pedestal 3 and 5 supporting the light-receiving element above the dielectric substrate is formed by disposing the high-refractive material in a predetermined pattern in the vicinity of the diffused waveguide and thermally diffusing the high-refractive material at the same time as forming the diffused waveguide.

The dielectric substrate used in the optical waveguide device can be suitably formed of lithium niobate or tantalum niobate. Ti can be suitably used as the high-refractive material forming the diffused waveguide.

In the invention, all or a part of the pedestal supporting the light-receiving element is formed at the same time as forming the diffused waveguide. At this time, a photo mask pattern is formed on the surface of the dielectric substrate and Ti is sputtered thereon to form a pattern corresponding to the optical waveguide 2 and the pedestal 3 shown in FIG. 1. Then, the photo mask pattern is removed and Ti is thermally diffused at a high temperature of about 1000° C., whereby the diffused waveguide 2 and the pedestal 3 are formed.

The height of the pedestal 3 is almost flush with the surface swell of the diffused waveguide 2. It is possible to precisely align the light-receiving element with the diffused waveguide by using this pedestal. With the height of only the pedestal 3, the gap between the surface of the diffused waveguide 2 and the light-receiving element 4 is almost zero and thus the optical power to be extracted may be excessively strong (the loss may be excessively great). In this case, as shown in FIG. 2, a film 5 for adjusting the height is formed on the pedestal 3 in which Ti is diffused. In the light-receiving element 4, a light-receiving portion 40 is disposed at a predetermined position on a substrate 42 formed of a high-refractive material.

In this case, the film is formed of $SiO_2$. $SiO_2$ is generally used as a film bonded to the bottom of an electrode as a buffer layer and can be formed by the same apparatus, which is desirable. The material of the film is not particularly limited. The film may be patterned so as not to cover a part of the diffused waveguide and to cover the waveguide part, or the film may be formed of a low-refractive material when the patterning is not formed, so that it is necessary not to influence the beam of the optical waveguide. In the former, a Ti film can be formed on the pedestal 3 so that the height of the pedestal 3 is higher than that of the diffused waveguide 2. In this case, it is necessary to consider the variation in height due to the thermal diffusion.

It is preferable that the predetermined pattern of the pedestal 3 is an island-like pattern with a gap interposed therebetween in at least one of the diffused waveguides. In FIG. 1, the island-like patterns are formed on both sides of the diffused waveguide. At the time of bonding the light-receiving element to the dielectric substrate, an adhesive 7 is interposed between the light-receiving element and the dielectric substrate and the unnecessary adhesive is discharged from the gap between the island-like patterns, whereby the adhesive does not exist between the light-receiving element 4 and the pedestal 3 and 5 and thus it is possible to precisely align the light-receiving element with the diffused waveguide.

The total area of the pedestal is set to be equal to or less than 60% of the bottom area of the light-receiving element. Accordingly, the satisfactory light-receiving sensitivity can be guaranteed and a necessary bonding area can be guaranteed between the light-receiving element and the dielectric substrate by the use of the adhesive flowing into the gap, thereby bonding the light-receiving element to the pedestal with satisfactory mechanical strength.

As the method of interposing the adhesive between the diffused waveguide and the light-receiving element, a method of applying the adhesive onto the diffused waveguide 2 and then disposing the light-receiving element 4 thereon and a method of disposing the light-receiving element on the pedestal and introducing the adhesive into the gap therebetween using a capillary phenomenon in the gap between the light-receiving element and the dielectric substrate can be used.

Figure 3:
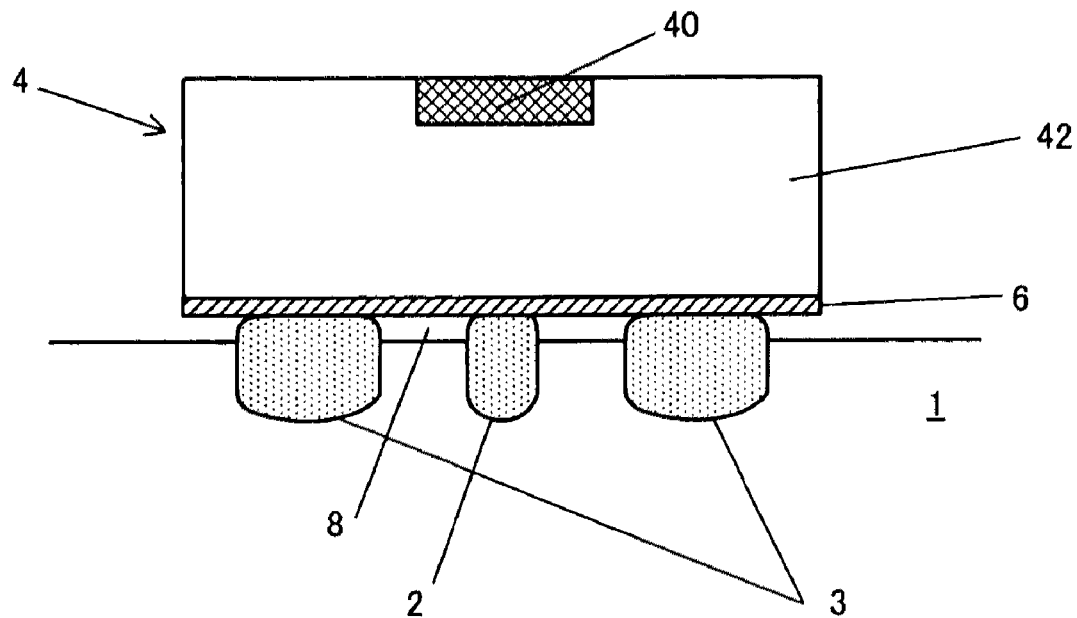
FIG. 3 is a sectional view taken along arrow line A-A' of FIG. 1 according to a second embodiment of the invention.

Another embodiment in which the gap between the diffused waveguide and the light-receiving element is adjusted will be described with reference to FIG. 3. FIG. 3 is a sectional view taken along arrow line A-A' of FIG. 1 according to a second embodiment of the invention.

In the second embodiment, a nitride film as the film 6 of a low-refractive material is formed on the surface of the light-receiving element 4 opposed to the pedestal 3. In FIG. 3, since the film is not patterned, the film needs be formed of a low-refractive material. The pedestal 3 and the film 6 form the gap between the surface of the diffused waveguide 2 and the light-receiving element 4. The adhesive can be disposed in the space represented by reference numeral 8, similarly to FIG. 2.

Figure 4:
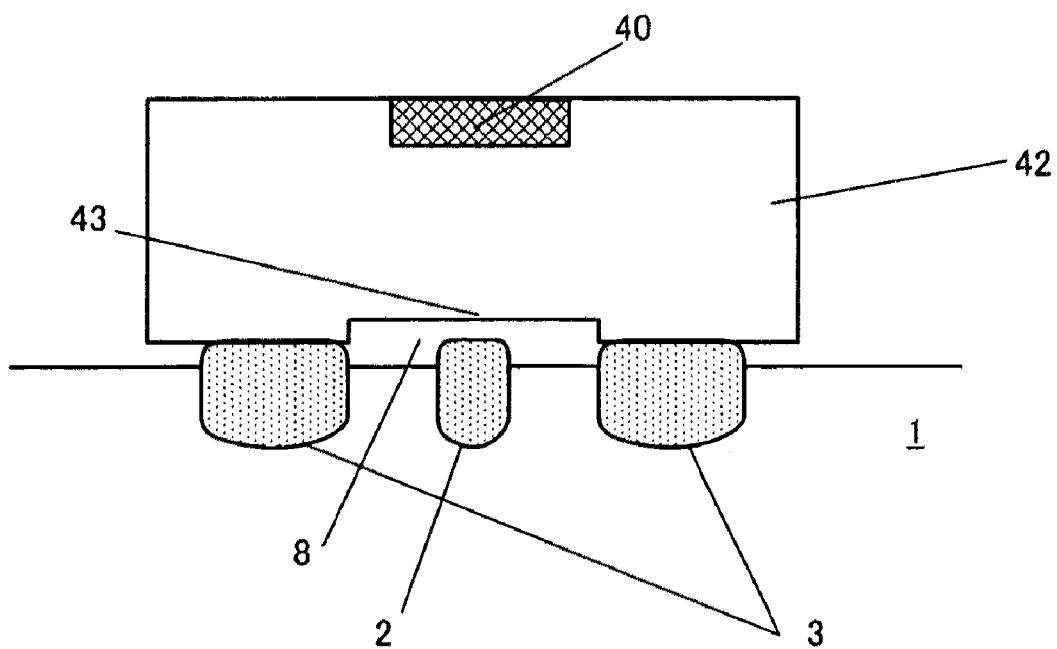
FIG. 4 is a sectional view taken along arrow line A-A' of FIG. 1 according to a third embodiment of the invention.

Another embodiment in which the gap between the diffused waveguide and the light-receiving element is adjusted will be described with reference to FIG. 4. FIG. 4 is a sectional view taken along arrow line A-A' of FIG. 1 according to a third embodiment of the invention.

In the third embodiment, the light-receiving element includes a high-refractive material 42 and a light-receiving portion 40. A concave portion is formed in a part of the high-refractive material 42 opposed to the diffused waveguide 2. According to this configuration, the gap between the diffused waveguide 2 and the high-refractive material 42 can be maintained to be a predetermined distance. The adhesive can be disposed in the space represented by reference numeral 8, similarly to FIG. 2.

Figure 5:
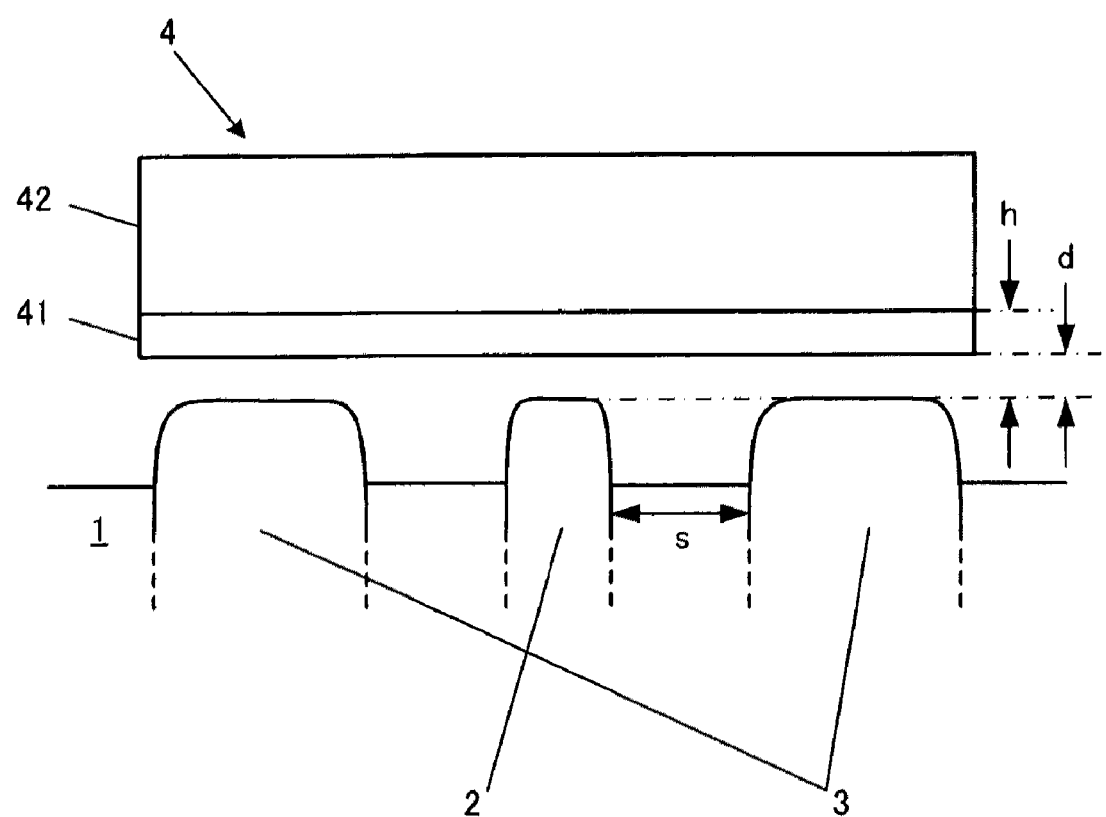
FIG. 5 is a diagram illustrating a gap between a diffused waveguide and a light-receiving element in the optical waveguide device according to the invention.

FIG. 5 is a diagram illustrating a gap between a diffused waveguide and a light-receiving element in the optical waveguide device according to the invention. Here, reference sign d represents the distance between the surface of the diffused waveguide 2 and the surface of the light-receiving element 4. In general, the distance d needs to be kept as a proper gap, but the distance h between the diffused waveguide 2 and a layer 42 is an important factor for determining the absorption state of an optical wave when the surface layer 41 of the light-receiving element 4 is formed of a low-refractive material and a high-refractive film is disposed as the layer represented by reference numeral 42. When it is intended to receive light of several % for the purpose of monitoring and the length of the light-receiving portion along the diffused waveguide is set to be equal to or less than 1000 μM, the distance h is in the range of 2000 to 2500 Å. When the distance is less than this range, the most optical waves propagating in the diffused waveguide are excessively absorbed, thereby increasing the optical loss. When the distance is greater than this range, the light-receiving power is decreased, thereby making the proper monitoring difficult.

Since the diffused waveguide and the pedestal need to be separated so that the optical waves propagating in the diffused waveguide should not be absorbed into the pedestal 3, it is preferable that the distance s between the diffused waveguide 2 and the pedestal 3 is set to be equal to or greater than 50 μm.

INDUSTRIAL APPLICABILITY

As described above, according to the invention, it is possible to provide an optical waveguide device which can allow a light-receiving element to be precisely aligned with a diffused waveguide formed in a dielectric substrate to implement an evanescent coupling light-receiving element.

What is claimed is:

1. An optical waveguide device comprising:
   a dielectric substrate;
   a diffused waveguide formed by thermally diffusing a high-refractive material into the dielectric substrate; and
   a light-receiving element which is disposed above the diffused waveguide and which receives a part of an optical wave propagating in the diffused waveguide,
   wherein the light-receiving element is supported by a pedestal that supports the light-receiving element above the dielectric substrate,
   at least part of the pedestal is formed by disposing the high-refractive material in a predetermined pattern in a vicinity of the diffused waveguide and thermally diffusing the high-refractive material at the same time as formation of the diffused waveguide, and
   a height of the pedestal is almost flush with a surface of the diffused waveguide.

2. The optical waveguide device according to claim 1, wherein the dielectric substrate is formed of lithium niobate and the high-refractive material is titanium.

3. The optical waveguide device according to claim 1, wherein the predetermined pattern is an island-like pattern with a gap in at least one side of the diffused waveguide and is configured to discharge or introduce an adhesive bonding the light-receiving element to the dielectric substrate from or into the gap.

4. The optical waveguide device according to claim 1, wherein a total area of a portion of the predetermined pattern corresponding to the pedestal contacting a bottom of the light-receiving element is equal to or less than 60% of a total area of the bottom of the light-receiving element.

5. The optical waveguide device according to claim 1, wherein a film for adjusting a gap between the diffused waveguide and a bottom of the light-receiving element is disposed in one or more of: a top surface of the pedestal formed of the high-refractive material, and a surface of the light-receiving element opposite to the pedestal.

6. The optical waveguide device according to claim 2, wherein the predetermined pattern is an island-like pattern with a gap in at least one side of the diffused waveguide and is configured to discharge or introduce an adhesive bonding the light-receiving element to the dielectric substrate from or into the gap.

7. The optical waveguide device according to claim 2, wherein a total area of a portion of the predetermined pattern corresponding to the pedestal contacting a bottom of the light-receiving element is equal to or less than 60% of a total area of the bottom of the light-receiving element.

8. The optical waveguide device according to claim 3, wherein a total area of a portion of the predetermined pattern corresponding to the pedestal contacting a bottom of the light-receiving element is equal to or less than 60% of a total area of the bottom of the light-receiving element.

9. The optical waveguide device according to claim 2, wherein a film for adjusting a gap between the diffused waveguide and a bottom of the light-receiving element is disposed in one or more of: a top surface of the pedestal formed of the high-refractive material, and a surface of the light-receiving element opposite to the pedestal.

10. The optical waveguide device according to claim 3, wherein a film for adjusting the gap is disposed in one or more of: a top surface of the pedestal formed of the high-refractive material, and a surface of the light-receiving element opposite to the pedestal.

11. The optical waveguide device according to claim 4, wherein a film for adjusting a gap between the diffused waveguide and the bottom of the light-receiving element is disposed in one or more of: a top surface of the pedestal formed of the high-refractive material, and a surface of the light-receiving element opposite to the pedestal.

* * * * *